US006721635B2

(12) United States Patent
MacTavish et al.

(10) Patent No.: US 6,721,635 B2
(45) Date of Patent: Apr. 13, 2004

(54) METHOD FOR LEVERAGING IN-VEHICLE RESOURCES (75) Inventors: Thomas J. MacTavish, Inverness, IL (US); Jurgen Reinold, Palatine, IL (US); Daniel K. Nichols, Hoffman Estates, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/123,541

(22) Filed: Apr. 16, 2002

(65) Prior Publication Data

US 2003/0195666 A1 Oct. 16, 2003

(51) Int. Cl.[7] .................................................. G06F 7/00
(52) U.S. Cl. .......................................................... 701/1
(58) Field of Search .................................. 701/1, 29, 33

(56) References Cited

U.S. PATENT DOCUMENTS 6,505,106 B1 * 1/2003 Lawrence et al. ............ 701/35

* cited by examiner

Primary Examiner—Yonel Beaulieu
(74) Attorney, Agent, or Firm—James A. Lamb (57) ABSTRACT

In-vehicle resources (wherein the resources each provide a common category of capacity to effect a processor effected activity) are leveraged by selecting the processor activity, selecting for at least one vehicle, a plurality of in-vehicle resources, and parsing facilitation of the processor effected activity by parsing the common category of capacity across the plurality of in-vehicle resources.

30 Claims, 4 Drawing Sheets

METHOD FOR LEVERAGING IN-VEHICLE RESOURCES

TECHNICAL FIELD

This invention relates generally to vehicles, and more particularly to sustained or supplemented functionality and/or features.

BACKGROUND

Personal, commercial, and industrial vehicles of various kinds are known in the art, and include automobiles, motorcycles, trucks, recreational vehicles of various kinds, boats, trailers, trains (both locomotives and cars) to name a few. Many such vehicles include various on-board systems that provide various kinds of specific functionality. For example, a modern automobile may include upwards of eighty microcontrollers/microprocessors with corresponding attendant memory to discretely support engine control, automatic window control, braking systems, cockpit temperature control, entertainment systems, and so forth. Furthermore, the respective quantity of such functionality tends to be increasing rather than decreasing or reaching a static condition.

At any given moment, typically, each such identifiable quantum of capacity is not used to a maximum extent. Some such components function only occasionally, if ever, while others experience intermittent rather than continuous usage. Viewed collectively, excess capacity in any given vehicle exists in varying amounts from moment to moment.

This observation can be extended when considering a plurality of vehicles (such as a managed fleet of vehicles, a group of vehicles comprising a similar model as manufactured by a common manufacturer, or simply a group of vehicles that all tend to operate in a common geographic area). That is, some given functional element as shared by most or all of the vehicles in a group of vehicles is unlikely to be maximally used in each such vehicle at all times. Viewed across the group, again, excess capacity exists for such elements.

Such excess capacity, both within an individual vehicle and with respect to a group of vehicles, constitutes an opportunity to benefit any number of parties, including the vehicle operators themselves and others. To date, however, such excess capacity remains an untapped opportunity. Vehicles, both as discrete entities and as part of a larger group of vehicles, tend to be designed with unexploited excess capacity being the norm.

BRIEF DESCRIPTION OF THE DRAWINGS

The above needs are at least partially met through provision of the method of leveraging in-vehicle resources described in the following detailed description, particularly when studied in conjunction with the drawings, wherein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements or steps that are useful or necessary in a commercially feasible embodiment are typically not depicted in order to facilitate a less obstructed view of these various embodiments of the present invention.

DETAILED DESCRIPTION

Figure 1:
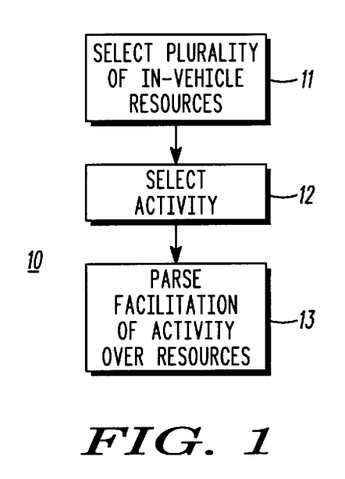
FIG. 1 comprises a general flow diagram as configured in accordance with an embodiment of the invention.

Generally speaking and referring now to FIG. 1, pursuant to these various embodiments, a plurality of in-vehicle resources are selected 11. The in-vehicle resources can be different from one another to an extent, provided that the resources contained within the selected group share at least one common category of capacity to effect a particular desired activity. For example, a common category of capacity could be memory, computational capacity, external communications capacity, or some specific functionality of interest. Therefore, for an automobile, an engine controller, brake controller, and window controller comprise resources that could be grouped together in this way because, although these controllers each have different specific functionality, each also has general computational capacity and memory. Such computational capacity and memory each constitutes a common category of capacity that is shared by these controllers. (It should be noted that, as used herein, the concept of "a common category of capacity" does not include external phenomena transducers as such. For example, interfaces such as temperature sensors, infrared sensors, weight sensors, image input devices, speakers, keyboards, cursor movement devices, display screens, and so forth are not a properly included category of capacity. "A common category of capacity" can include, however, specific functionality that utilizes such transducers to receive and/or impart information.)

An activity is then selected 12 and facilitation of that activity is parsed 13 across the previously selected plurality of resources. Various examples of activities and resources are set forth below to aid in illustrating these steps.

Figure 2:
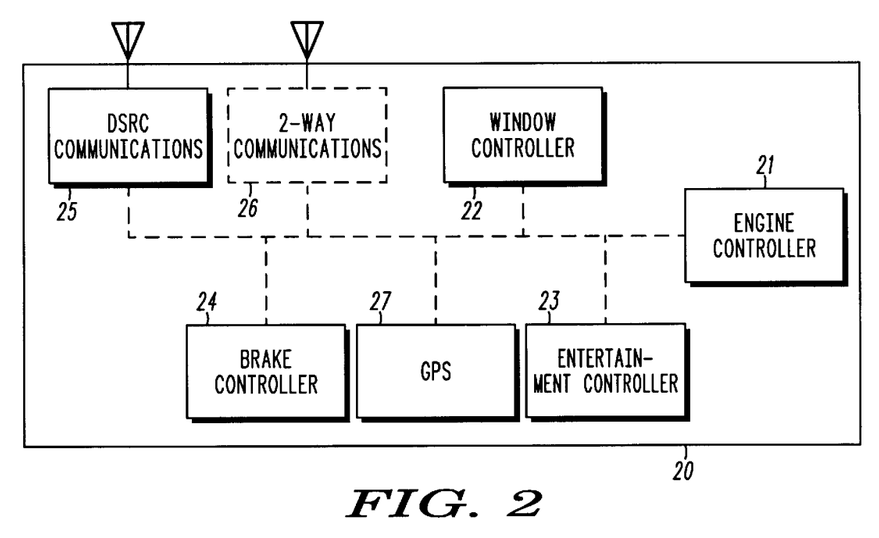
FIG. 2 comprises a simplified block diagram of a vehicle as configured in accordance with an embodiment of the invention.

As one illustrative example, and referring now to FIG. 2, a vehicle, such as an automobile 20, includes a number of subsystems. In this particular embodiment these subsystems include an engine controller 21, a window controller 22, an entertainment system 23, a brake controller 24, and two communications units (a dedicated short range communications (DSRC) unit 25 and a 2-way communications unit 26 such as, for example, a land mobile frequency radio or a cellular telephony device). Many other subsystems are of course typically provided in an ordinary automobile but are not shown here for purposes of clarity. Other optional systems, such as a global positioning system (GPS) unit 27 could also be provided as desired and appropriate. Some or all of these subsystems can be coupled to one another through an internal bus 28 such that partial or full communications therebetween can be supported. In this example, all of these components serve different specific functions but also all share certain common categories of capacity. In particular, each of these components includes computational capacity and, typically, memory storage capacity. Two of these components (the two communications devices 25 and 26) also comprise an additional plurality of in-vehicle resources with an additional common category of capacity, namely, external communications capability.

Pursuant to this embodiment, at least one of these pluralities of resources (serving computational capacity, memory, and external communications) is selected. For purposes of this example, computational capacity is selected as the common category of capacity and the engine controller 21, window controller 22, brake controller 24, and entertainment system 23 are selected as the plurality of resources that have this computational capacity as the common category of capacity. For purposes of this example the activity to be facilitated is operation of the vehicle engine. During ordinary operation, the engine controller 21 facilitates this activity. For whatever reason, however, the engine controller 21 may become unable to fully meet this task. Under ordinary circumstances, such a condition may render the vehicle 20 undrivable. Pursuant to this embodiment, however, this engine operation activity can be parsed out over the plurality of resources.

Figure 3:
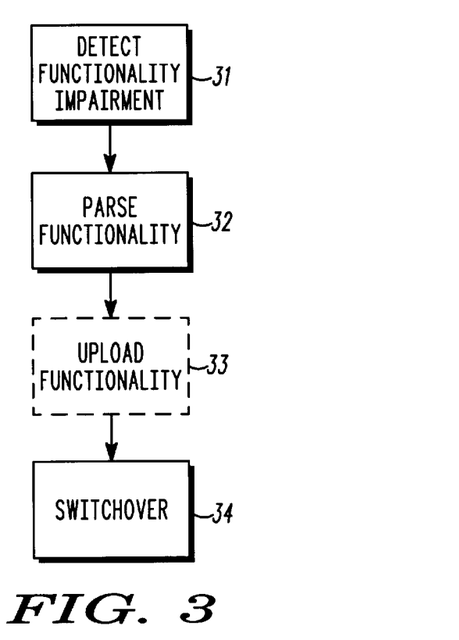
FIG. 3 comprises a flow diagram as configured in accordance with an embodiment of the invention.

More particularly, and referring now to FIG. 3, upon detecting 31 functionality impairment in this regard, the functionality is parsed 32 over the resources. That is, the engine controller programming is parsed over engine controller 21, the window controller 22, the brake controller 24, and the entertainment system 23 as appropriate to allow the computational capacity of these devices to all be brought to bear. If the engine controller 21 is only able to manage 20% of the necessary load, then the remaining load is distributed over the computational capacity of the other resources. If the other resources do not already have the necessary programming to permit this, then an optional step of uploading 33 the corresponding programming to the selected resources may be necessary. When the parsed activity is sufficiently operable, switchover 34 of engine control is then actuated to achieve, in this example, distributed processing in support of engine control.

The above actions are intended to be illustrative as to a general process. Many variations are appropriate to accommodate a variety of individual circumstances. For example, the combined available computational capacity of these resources may be insufficient to accommodate full-time full-featured replacement of the missing engine controller capacity. Under these circumstances, however, the available capacity may still nevertheless permit implementation of at least a limp-home mode of operation. Such a mode of operation is still preferable to total effective loss of engine control.

Figure 4:
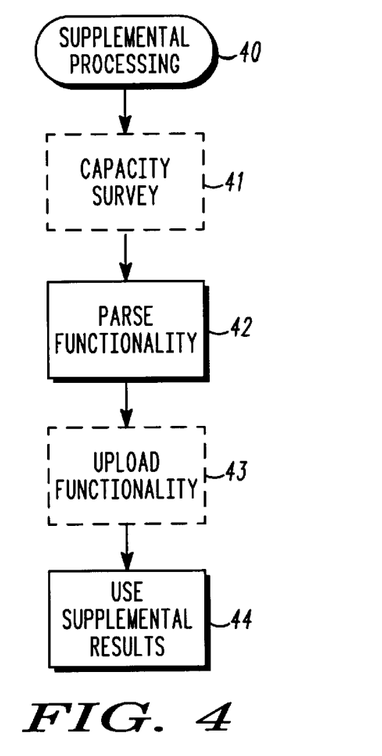
FIG. 4 comprises a flow diagram as configured in accordance with an embodiment of the invention.

In the example just presented, it is loss of capacity in one resource that triggers parsing the activity over other resources that share the same capacity to at least partially serve. The principles of these embodiments are not necessarily limited to service in only this regard, however. For example, the engine controller 21 may be fully operational, and yet still be unable to perform certain desired actions from time to time due to capacity limitations. Such supplemental processing 40 can also be parsed over the available resources as generally illustrated in FIG. 4. Upon determining a need for supplemental processing capacity, the additional functionality can again be parsed 42 over the available resources (if present capacity availability and limitations are not already known, a capacity survey can first be conducted 41 to ascertain present availability of the other resources). If necessary, programming or other enabling capacity is uploaded 43 to the selected resources. The results of the parsed activities are then used 44 as supplemental information.

As a simple example of the above supplemental processing 40, an engine controller 21 may use a set of parameters in conjunction with engine control algorithms. From time to time it may be helpful to recalculate one or more of these parameters (for example, such parameters may beneficially vary in known or measurable ways with time, mileage, altitude, fuel composition, driver behaviors, time of day, external temperature, weight, road incline, and so forth). Rather than providing the engine controller 21 with sufficient capacity to calculate such parameters from time to time as based upon new information (which capacity may represent otherwise unnecessary and excess capacity for the engine controller 21), the vehicle can utilize the other resources that share this aspect of common capacity to met the activity need. So configured, the needs of the vehicle are met while simultaneously lowering the total excess capacity overhead of the vehicle design.

The above examples illustrate the potency of the overall process to minimize resource capacity while simultaneously serving necessary activities. Beneficially, these results are potentially attained in a way such that both cost savings and efficiency, optimization, and efficacy are jointly realized rather than one being achieved at the expense of another.

The above examples are intended to demonstrate the application of the overall process in the context of an individual vehicle. The process is also applicable to a multiplicity of vehicles, however, as the following examples so illustrate.

Figure 5:
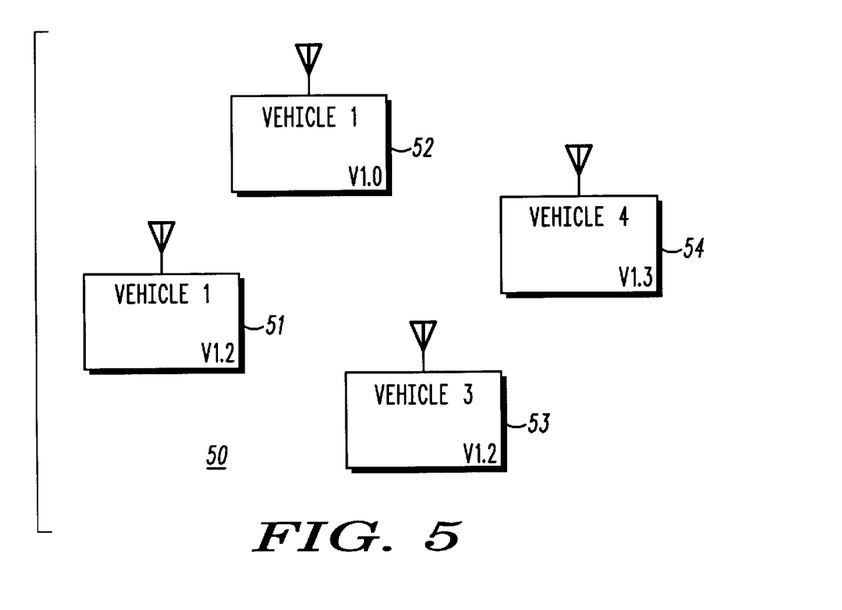
FIG. 5 comprises a block diagram of a plurality of vehicles as configured in accordance with an embodiment of the invention.

Referring now to FIG. 5, a group 50 of vehicles can be comprised, for example, of models offered and sold by a particular manufacturer wherein each vehicle is further equipped with two-way radio communications capability (such as, but not limited to, DSRC compatible or similar communications capability). Each vehicle in this group 50 can have an engine controller that effects its functionality, at least in part, through use of a corresponding engine controller software program. This engine controller functionality can comprise the specific functionality that constitutes a common category of capacity for a resource, the engine controller software program. In this example the plurality of resources constitute the plurality of engine controller software programs as exist in the group 50 of vehicles.

In this example, the engine controller software program is upgraded from time to time by the manufacturer. By making use of the processes of these embodiments, such software programs are readily upgradable in a fashion that is virtually transparent to the user and without significant cost to any party including the manufacturer. In particular, and referring now to FIG. 7, a version update process 7 can allow a vehicle to receive 71 a version number of the software program that corresponds to another vehicle and determine 72 whether that version is more current than the version presently used by the vehicle in question. When the other version is more current, the present vehicle then downloads 73 that newer version. When the other version is not more current, the present vehicle can also determine 74 whether the other version is less current than the version used by the present vehicle. When true, the present vehicle can instead upload 75 its more current version of the software program to the other vehicle, following which the process 70 concludes 76.

To provide a specific example, consider the previously depicted group 50 of FIG. 5 wherein vehicle 1 51 has version 1.2 of the software program, vehicle 2 52 has version 1.0, vehicle 3 53 has version 1.2, and vehicle 4 54 has version 1.3. Vehicle 4 54 has the most current version while vehicle 2 52 has the most outdated version. When vehicle 1 51 exercise the just described process with vehicle 2 52, vehicle 1 51 will determine that it has the most current version of the software program and hence will provide it's version to vehicle 2 52. When vehicle 1 51 encounters vehicle 4 54, however, vehicle 1 51 will determine that vehicle 4 54 has the more current version and hence will download this more current version to itself So configured, a software modification or upgrade can be readily proliferated throughout a user population without requiring a service/maintenance visit, notice, or other time consuming or potentially expensive action or interlude.

In the above example, a single basic resource is leveraged across the vehicle population to achieve the indicated results. The overall process may also be usefully employed with a plurality of leveraged resources. For example, while the vehicles in group 50 of the above example all have two-way communications capability, it is possible that the bandwidth throughput limitations of their system is not adequate to always ensure a complete download of a new version of the software program when two vehicles exchange information as described. In such a case the external communications capability of each vehicle itself can constitute another common category of capacity that is distributed over the user base and that can be leveraged as described.

Figures 7, 8:
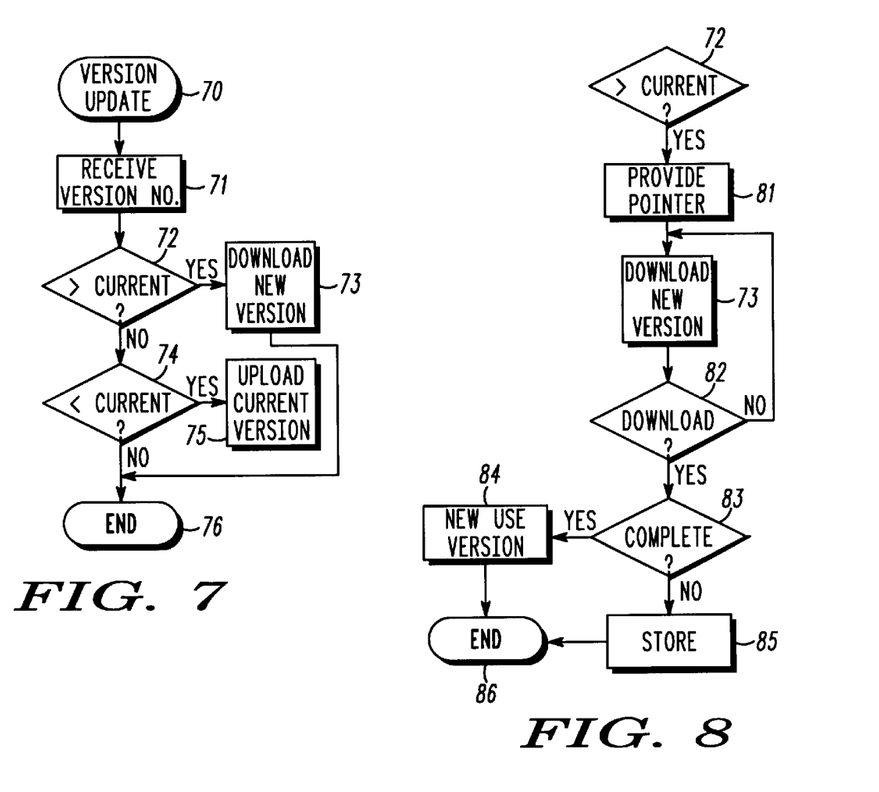
FIG. 7 comprises a flow diagram as configured in accordance with an embodiment of the invention.
FIG. 8 comprises a flow diagram as configured in accordance with an embodiment of the invention.

Such a process can begin as suggested in FIG. 7 with an exchange of version numbers between two vehicles. Upon determining 72 that one vehicle has a more current version of the program, the process can instead proceed as set forth in FIG. 8. Specifically, the vehicle having the less-current software program can provide 81 a pointer or other indicator to aid the second vehicle in identifying that portion of the new program that the first vehicle may already have obtained elsewhere. The second vehicle then begins to download 73 relevant portions of the newer version to the first vehicle. When the first vehicle determines 82 that the download stream has concluded, the first vehicle then determines 83 whether the software program is now complete. If so, the first vehicle can now use 84 the new version and conclude the process 86. If the entire software program has not yet been fully received, however, the first vehicle can store 85 what has been received (and update the pointer or other indicia regarding where the download may next begin). The process can then be repeated as necessary with other vehicles to eventually receive the entire program.

Figure 6:
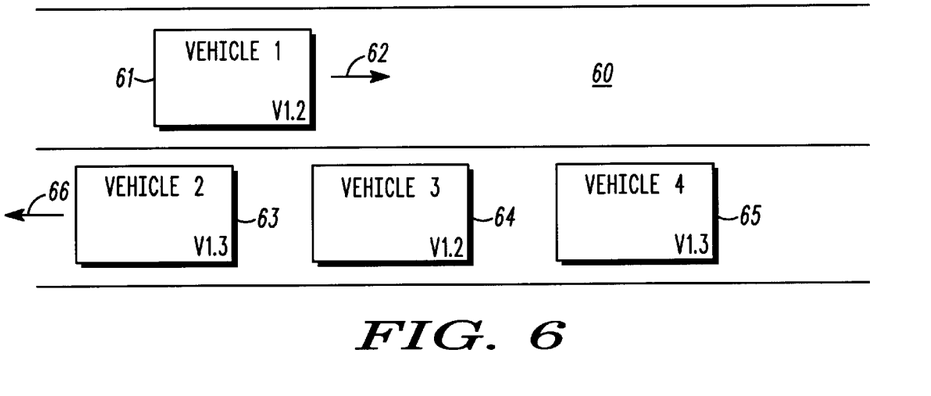
FIG. 6 comprises a top plan schematic view of vehicles on a roadway as configured in accordance with an embodiment of the invention.
Figure 9:
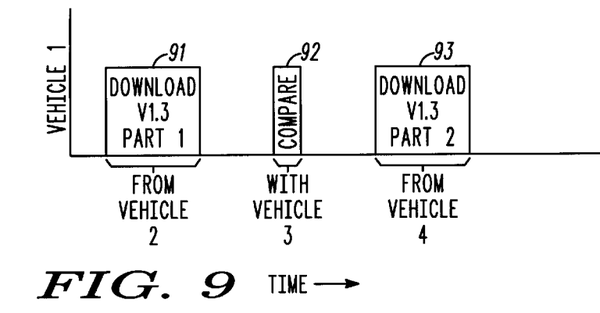
FIG. 9 comprises a timing diagram as configured in accordance with an embodiment of the invention.

To establish an example, consider FIG. 6. That figure depicts a roadway 60 featuring a first vehicle 61 traveling in a first direction 62 and three other vehicles 63 65 traveling in the opposite direction 66. The first vehicle 61 has a version of the engine controller software program that is less current than two of the other vehicles 63 and 65. In this example, however, the speed at which these vehicles pass through an effective range of communications with one another is such that a complete download of the updated software program cannot be assured. Referring now to FIG. 59 when vehicle 1 is within range of vehicle 2, part 1 of version 1.3 of the software program can be downloaded 91. The downloading stops when the two vehicles move out of communication range with each other. Later, when vehicle 1 comes within range of vehicle 3, the two vehicles compare 92 their respective versions and conclude that both have the same version. In this example, no downloading occurs. Later still, when vehicle 1 comes within range of vehicle 4, part 2 of version 1.3 is downloaded 93 to vehicle 1. In this example, not only is the activity of upgrading in-vehicle software parsed out over the specific functionality resources of these vehicles, but also over the external communications capability of these vehicles.

In the above example, vehicle 1 and vehicle 3 exchanged no software program data with one another because both were using an identical version of the program. In an alternative embodiment, however, vehicle 1, which does have Part 1 of a newer version, could upload that Part 1 to vehicle 3. Using this alternative approach, software versions could be proliferated even more quickly through a user population since full versions would not be a prerequisite requirement for transferring the upgrade to another party.

So configured, two groups of resources are utilized to achieve the selected activity of upgrading the engine controller software of a plurality of vehicles. As powerful as this result is, the more important point is to understand and appreciate that this result constitutes but yet another application and example of the powerful overall process described earlier:

selecting, for at least one vehicle, a plurality of in-vehicle resources, wherein the plurality of in-vehicle resources each provide a common category of capacity to effect a particular desired activity;

selecting at least one activity; and parsing facilitation of the at least one activity across the plurality of in-vehicle resources.

The example just given can be modified to exhibit even further the breadth and scope of the present process. Consider now that at least some of the vehicles in the group have the capability to modify, from time to time, the operating parameters used to implement their engine controller programming (to reflect local conditions such as altitude, average road inclines, fuel mixtures, and so forth) (depending upon a variety of circumstances, such modifications may be dynamically discernable by the vehicle itself and/or might be downloaded to the vehicle by a local service facility). Such local parameters as stored in a given vehicle can be correlated to a geographic area. A vehicle having information regarding its present location can therefore select to use such modified parameters to the extent that the parameters are otherwise available.

Figure 10:
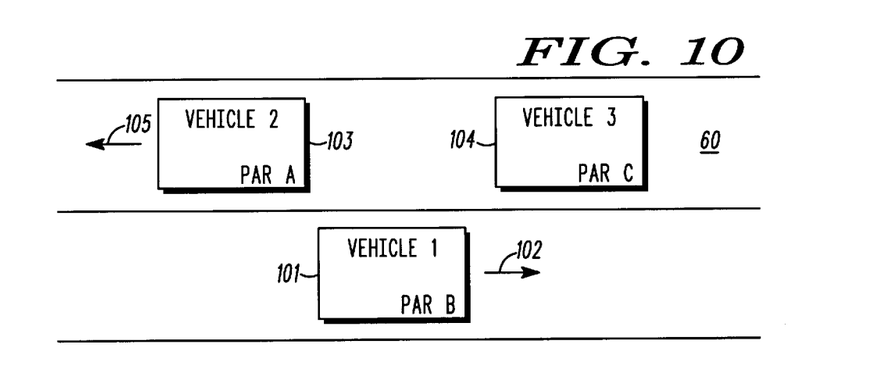
FIG. 10 comprises a top plan schematic view of vehicles on a roadway as configured in accordance with an embodiment of the invention.
Figure 11:
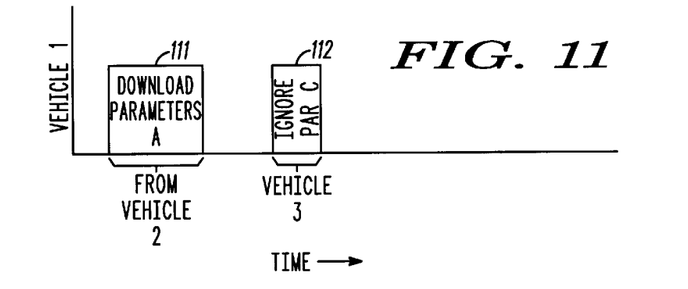
FIG. 11 comprises a timing diagram as configured in accordance with an embodiment of the invention.

Referring now to FIG. 10, in this example a roadway 60 features a first vehicle 101 traveling in a first direction 102 and two other vehicles 103 and 104 traveling in an opposite direction 105. The first vehicle 101 has engine controller operating parameters B that are not specifically shaped to reflect present geographic local conditions. The second vehicle 105, however, has engine controller operating parameters A that are customized for local conditions (the third vehicle 104 has operating parameters C that are customized to a different locality). Presuming this arrangement, and referring now to FIG. 11, the above processes can be readily modified to allow upgrading of engine controller software programming as already described and also to allow the first vehicle to download 111 the local operating parameters from the second vehicle. So configured, two activities (upgrading engine controller software and benefiting from locally customized operating parameters) are parsed over a plurality of resources to achieve significant benefits. As the first vehicle continues to travel, and comes within communication range of the third vehicle, the first vehicle will ignore 112 the operating parameters of the third vehicle since those parameters offer no benefit. (In an alternative embodiment, if the first vehicle is equipped with navigation devices such that the first vehicle can discern that the operating parameters of the third vehicle will eventually be useful to the first vehicle because the first vehicle will eventually be operating in the locale that is particular to those operating parameters, then the first vehicle can download the third vehicle's operating parameters and store them for later use.)

Figure 12:
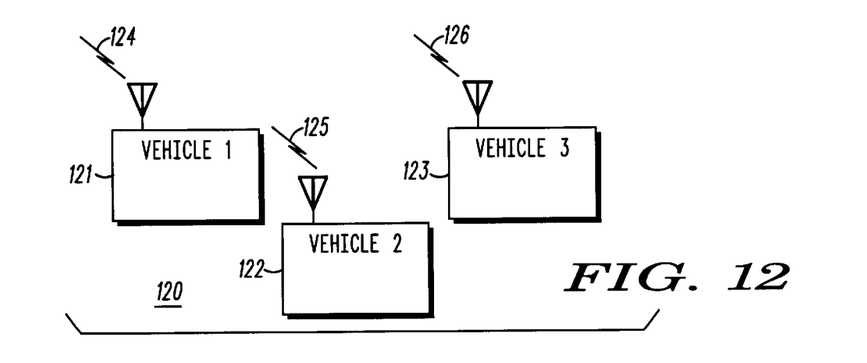
FIG. 12 comprises a block diagram of a plurality of vehicles as configured in accordance with an embodiment of the invention.

As one last specific example, consider FIG. 12. In this figure, three vehicles 121, 122, and 123 belonging to a group 120 such as, for example, a fleet, are each equipped with a two-way radio receiver. From time to time the fleet operator transmits a data-rich message (comprising, for example, video information, updated maps, audio information, and so forth) to the fleet. Bandwidth limitations may be significant, however, and preclude effective real-time playback of the information transmitted. A present approach would be to transmit the entire message to each intended recipient, following which each recipient could review the information received. Such a transmission can take a considerable period of time, however. This duration of time may cause a variety of issues and problems. Instead, pursuant to these teachings, the external communications capability of these fleet vehicles constitutes an exploitable resource, and the activity of receiving the entire message can be parsed over these resources by transmitting only a part of the entire message to each vehicle. For example, a first part of the message could be transmitted 124 to the first vehicle 121, a second part of the message could be transmitted 125 to the second vehicle 122, and a third part of the message could be transmitted 126 to the third vehicle 123. These vehicles could then later exchange this information amongst themselves (using processes similar to those described above to propagate software content and/or through other means) to eventually allow all of the vehicles to have and utilize the entire message.

Again, it should be understood and appreciated that these examples are illustrative only. While they represent worthy examples in and of themselves, they really serve primarily to demonstrate the versatility, flexibility, and power of the overall process itself. A wide variety of categories of capacity are usefully leveraged in these ways, including but not limited to:

memory capacity;
type of memory;
computational capacity;
computational capacity per unit of time;
computational capacity compatible with facilitating the at least one activity;
external communications reception capability;
external communications reception bandwidth;
external communications reception compatibility;
external communications transmission capability;
external communications transmission bandwidth;
external communications transmission compatibility; and
specific functionality.

Similarly, a wide variety of activities can be parsed over such resources to achieve the same or improved performance, efficiency, and cost effectiveness as compared to present practices and designs.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method of leveraging in-vehicle resources, comprising:

identifying a processor effected nativity that can be accomplished by adding a common category of capacity to the processor effected activity;

selecting, for at least one vehicle, a plurality of in-vehicle resources, wherein the plurality of in-vehicle resources can each provide the common category of capacity;

parsing facilitation of the processor effected activity by parsing the common category of capacity across the plurality of in-vehicle resources.

2. The method of claim 1 wherein selecting a plurality of in-vehicle resources comprises selecting, for a plurality of vehicles, a plurality of in-vehicle resources, wherein the plurality of in-vehicle resources each provide the common category of capacity, and wherein each of the plurality of vehicles has at least one of the in-vehicle resources.

3. The method of claim 1 wherein the common category of capacity comprises at least one of:

memory;
computational capacity;
external communications capability; and
specific functionality.

4. The method of claim 1 wherein the common category of capacity comprises at least one of:

memory capacity;
type of memory;
computational capacity;
computational capacity per unit of time;
computational capacity compatible with facilitating the at least one activity;
external communications reception capability;
external communications reception bandwidth;
external communications reception compatibility;
external communications transmission capability;
external communications transmission bandwidth;
external communications transmission compatibility; and
specific functionality.

5. The method of claim 1 wherein the common category of capacity comprises specific functionality including a software program.

6. The method of claim 5 wherein the processor effected activity includes facilitating that each vehicle of the plurality of vehicles has a current version of the software program.

7. The method of claim 6 wherein parsing facilitation of the processor effected activity includes having the plurality of vehicles automatically exchange information amongst themselves regarding their own present version of the software program, and having vehicles with a more current version of the software program provide such more current version of the software program to vehicles with a less current version of the software program.

8. The method of claim 2 wherein selecting, for a plurality of vehicles, a plurality of in-vehicle resources, wherein the plurality of in-vehicle resources each provide the common category of capacity, and wherein each of the plurality of vehicles has at least one of the in-vehicle resources further comprises selecting at least two pluralities of the in-vehicle resources, wherein each of the at least two pluralities represents a different one of at least two common categories of capacity.

9. The method of claim 8 wherein at least one of the at least two common categories of capacity comprises at least one of:
   memory;
   computational capacity;
   external communications capability; and
   specific functionality.

10. The method of claim 8 wherein each of the at least two common categories of capacity as corresponds to the at least two pluralities of the in-vehicle resources comprises at least one of:
    memory;
    computational capacity;
    external communications capability; and
    specific functionality.

11. The method of claim 10 wherein a first one of the at least two common categories of capacity comprises specific functionality including a software program.

12. The method of claim 11 wherein a second one of the at least two common categories of capacity comprises external communications capability.

13. The method of claim 12 wherein the processor effected activity includes facilitating that each of the vehicles of the plurality of vehicles has a current version of the software program.

14. The method of claim 13 wherein parsing facilitation of the processor effected activity includes having the plurality of vehicles automatically exchange information amongst themselves regarding their own present version of the software program, and having vehicles with a more current version of the software program provide such more current version of the software program to vehicles with a less current version of the software program, and wherein the external communications capability of a plurality of the vehicles are used to provide such more current version of the software program to at least one of the vehicles having a less current version of the software program.

15. The method of claim 6 wherein identifying the processor effected activity further includes identifying an additional processor effected activity comprising facilitating that each vehicle of the plurality of vehicles has locally relevant parameters to facilitate local operation of the software program.

16. The method of claim 15 wherein parsing facilitation of the processor effected activity includes having the plurality of vehicles automatically exchange information amongst themselves regarding their own present version of the software program and the parameters, and having vehicles with a more current version of the software program provide such more current version of the software program to vehicles with a less current version of the software program and having vehicles with more relevant local parameters provide the more relevant local parameters to vehicles with less relevant local parameters.

17. The method of claim 16 wherein a second common category of capacity comprises external communications capability.

18. The method of claim 17 wherein parsing facilitation of the processor effected activity across the plurality of in-vehicle resources includes having the plurality of vehicles automatically exchange information amongst themselves regarding their own present version of the software program and the parameters, and having vehicles with a more current version of the software program provide such more current version of the software program to vehicles with a less current version of the software program and having vehicles with more relevant local parameters provide the more relevant local parameters to vehicles with less relevant local parameters, wherein the external communications capability of a plurality of the vehicles are used to provide such more current version of the software program and the more relevant local parameters to at least one vehicle of the plurality of vehicles.

19. The method of claim 1 wherein selecting, for at least one vehicle, a plurality of in-vehicle resources, includes selecting for one vehicle a plurality of the in-vehicle resources.

20. The method of claim 18 wherein the common category of capacity comprises at least one of:
    memory;
    computational capacity;
    external communications capability; and
    specific functionality.

21. The method of claim 19 wherein the common category of capacity comprises computational capacity that can be used to support specific functionality.

22. The method of claim 21 wherein selecting the processor effected activity includes assuring that at least portions of a software program are processed, thereby ensuring at least partial support of the specific functionality, when a primary processing platform corresponding to the software program is at least partially non-functional.

23. The method of claim 22 wherein parsing facilitation of the processor effected activity across the plurality of in-vehicle resources includes having the plurality of in-vehicle resources distributively process the at least portions of the software program when the primary processing platform is at least partially non-functional.

24. A method of leveraging in-vehicle resources, comprising:
    selecting, for at least one vehicle, a plurality of in-vehicle resources, wherein the plurality of in-vehicle resources each provide a common category of capacity to effect a processor effected activity, wherein the selecting comprises selecting, for a plurality of vehicles, a plurality of in-vehicle resources, wherein the plurality of in-vehicle resources each provide a common category of capacity to effect the processor effected activity, and wherein each of the plurality of vehicles has at least one of the in-vehicle resources;
    selecting at least one activity;
    parsing facilitation of the at least one activity across the plurality of in-vehicle resources,
    wherein the common category of capacity comprises specific functionality including a software program and zero or more of
       memory,
       computational capacity, and
       external communications capability, and
    wherein selecting at least one activity includes selecting facilitating that each of the plurality of plurality of vehicles has a current version of the software program, and wherein parsing facilitation of the at least one activity across the plurality of in-vehicle resources includes having the plurality of vehicles automatically exchange information amongst themselves regarding their own present version of the software program, and having vehicles with a more current version of the software program provide such more current version of the software program to vehicles with a less current version of the software program.

25. A method of leveraging In-vehicle resources, comprising:

selecting, for at least one vehicle, a plurality of in-vehicle resources, wherein the plurality of in-vehicle resources each provide a common category of capacity to effect a processor effected activity, wherein the selecting comprises selecting, for a plurality of vehicles, a plurality of in-vehicle resources, wherein the plurality of in-vehicle resources each provide a common category of capacity to effect the processor effected activity, and wherein each of the plurality of vehicles has at least one of the in-vehicle resources, further comprising selecting at least two pluralities of the in-vehicle resources, wherein each of the at least two pluralities represents a different common category of capacity;

selecting at least one activity; and parsing facilitation of the at least one activity across the plurality of in-vehicle resources, wherein each of the common categories of capacity as corresponds to the at least two pluralities of the in-vehicle resources comprises at least one of
memory,
computational capacity,
external communications capability, and
specific functionality; and wherein a first one of the common categories of capacity comprises specific functionality including a software program, and wherein a second one of the common categories of capacity comprises external communications capability, and wherein selecting at least one activity includes selecting facilitating that each of the plurality of plurality of vehicles has a current version of the software program, and wherein parsing facilitation of the at least one activity across the plurality of in-vehicle resources includes having the plurality of vehicles automatically exchange information amongst themselves regarding their own present version of the software program, and having vehicles with a more current version of the software program provide such more current version of the software program to vehicles with a less current version of the software program, wherein the external communications capability of a plurality of the vehicles are used to provide such more current version of the software program to at least one of the vehicles having a less current version of the software program.

26. A method of leveraging in-vehicle resources, comprising;

selecting, for at least one vehicle, a plurality of in-vehicle resources, wherein the plurality of in-vehicle resources each provide a common category of capacity to effect a processor effected activity, wherein the plurality of in-vehicle resources each provide a common category of capacity to effect the processor effected activity and wherein each of the plurality of vehicles has at least one of the in-vehicle resources;

selecting at least one activity;

parsing facilitation of the at least one activity across the plurality of in-vehicle resources, wherein the common category of capacity comprises specific functionality including a software program and zero or more of
memory,
computational capacity, and
external communications capability, and wherein selecting at least one activity includes selecting facilitating that each of the plurality of plurality of vehicles has a current version of the software program, and wherein selecting at least one activity further includes selecting an additional activity comprising facilitating that each of the plurality of plurality of vehicles has locally relevant parameters to facilitate local operation of the software program, and wherein parsing facilitation of the at least one activity across the plurality of in-vehicle resources includes having the plurality of vehicles automatically exchange Information amongst themselves regarding their own present version of the software program and the parameters, and having vehicles with a more current version of the software program provide such more current version of the software program to vehicles with a less current version of the software program and having vehicles with more relevant local parameters provide the more relevant local parameters to vehicles with less relevant local parameters.

27. The method of claim 26 wherein a second one of the common categories of capacity comprises external communications capability.

28. The method of claim 27 wherein parsing facilitation of the at least one activity across the plurality of in-vehicle resources includes having the plurality of vehicles automatically exchange information amongst themselves regarding their own present version of the software program and the parameters, and having vehicles with a more current version of the software program provide such more current version of the software program to vehicles with a less current version of the software program and having vehicles with more relevant local parameters provide the more relevant local parameters to vehicles with less relevant local parameters, wherein the external communications capability of a plurality of the vehicles are used to provide such more current version of the software program and the more relevant local parameters to at least one of the vehicles.

29. A method of leveraging in-vehicle resources, comprising:

selecting, for at least one vehicle, a plurality of in-vehicle resources, wherein the plurality of in-vehicle resources each provide a common category of capacity to effect a processor effected activity, wherein the selecting Includes selecting tar one vehicle a plurality of the in-vehicle resources;

selecting at least one activity; and parsing facilitation of the at least one activity across the plurality of in-vehicle resources, wherein the common category of capacity for the plurality of in-vehicle resources comprises at least one of
memory,
computational capacity, external communications capability, and specific functionality, and wherein the common category of capacity comprises computational capacity that can be used to support specific functionality, and wherein selecting at least one activity includes assuring that at least portions of a software program are processed, thereby ensuring at least partial support of the specific functionality, when a primary processing platform as corresponds to the software program is at least partially non-functional.

30. The method of claim 29 wherein parsing facilitation of the at least one activity across the plurality of in-vehicle resources includes having the plurality of in-vehicle resources distributively process the at least portions of the software program when the primary processing platform Is at least partially non-functional.

* * * * *

UNITED STATES PATENT AND TRADEMARK OFFICE
CERTIFICATE OF CORRECTION

PATENT NO.    : 6,721,635 B2
DATED         : April 13, 2004
INVENTOR(S)   : MacTavish et al.

It is certified that error appears in the above-identified patent and that said Letters Patent is hereby corrected as shown below:

Column 8,
Line 14, Claim 1 should appear:

1. A method of leveraging in-vehicle resources, comprising:
    identifying a processor effected activity that can be accomplished by adding a common category of capacity to the processor effected activity;
    selecting, for at least one vehicle, a plurality of in-vehicle resources, wherein the plurality of in-vehicle resources can each provide the common category of capacity;
    parsing facilitation of the processor effected activity by parsing the common category of capacity across the plurality of in-vehicle resources.

Column 12,
Line 52, Claim 29 should appear:

29. A method of leveraging in-vehicle resources, comprising:
    selecting, for at least one vehicle, a plurality of in-vehicle resources, wherein the plurality of in-vehicle resources each provide a common category of capacity to effect a processor effected activity, wherein the selecting includes selecting for one vehicle a plurality of the in-vehicle resources;
    selecting at least one activity; and
    parsing facilitation of the at least one activity across the plurality of in-vehicle resources,
    wherein the common category of capacity for the plurality of in-vehicle resources comprises at least one of
        memory,
        computational capacity,
        external communications capability, and
        specific functionality, and

UNITED STATES PATENT AND TRADEMARK OFFICE
CERTIFICATE OF CORRECTION

PATENT NO. : 6,721,635 B2
DATED : April 13, 2004
INVENTOR(S) : MacTavish et al.

It is certified that error appears in the above-identified patent and that said Letters Patent is hereby corrected as shown below:

Column 12 (cont'd), wherein the common category of capacity comprises computational capacity that can be used to support specific functionality, and wherein selecting at least one activity includes assuring that at least portions of a software program are processed, thereby ensuring at least partial support of the specific functionality, when a primary processing platform as corresponds to the software program is at least partially non-functional.

Signed and Sealed this

Fifth Day of April, 2005

JON W. DUDAS
*Director of the United States Patent and Trademark Office*